US012657113B2

(12) United States Patent
Kita

(10) Patent No.: US 12,657,113 B2
(45) Date of Patent: Jun. 16, 2026

(54) ESTIMATING CAUSE OF APPLICATION INSTABILITY

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 245 days.

(21) Appl. No.: 18/574,075

(22) PCT Filed: Dec. 26, 2022

(86) PCT No.: PCT/JP2022/048029
§ 371 (c)(1),
(2) Date: Dec. 26, 2023

(87) PCT Pub. No.: WO2024/142179
PCT Pub. Date: Jul. 4, 2024

(65) Prior Publication Data
US 2025/0103469 A1     Mar. 27, 2025

(51) Int. Cl.
G06F 9/44       (2018.01)
G06F 11/362     (2025.01)
(52) U.S. Cl.
CPC .................................. G06F 11/366 (2013.01)
(58) Field of Classification Search
CPC ................................................... G06F 11/366
See application file for complete search history.

(56) References Cited

U.S. PATENT DOCUMENTS

| | | | | |
|---|---|---|---|---|
| 9,164,872 B2 * | 10/2015 | Moser | ................. | G06F 11/3636 |
| 10,127,069 B2 * | 11/2018 | Zada | ................... | G06F 11/3698 |
| 10,365,985 B2 * | 7/2019 | Wagner | ............... | G06F 11/3466 |
| 11,063,843 B2 * | 7/2021 | Brajkovic | ........... | G06F 11/3409 |
| 2020/0409780 A1 | 12/2020 | Balasubramanian et al. | | |
| 2023/0040676 A1 * | 2/2023 | Kita | ................... | H04L 41/5045 |

FOREIGN PATENT DOCUMENTS

| | | |
|---|---|---|
| JP | 2019-012477 A | 1/2019 |
| WO | 2021171210 A1 | 9/2021 |

OTHER PUBLICATIONS

International Search Report in PCT/JP2022/048029, mailed Mar. 14, 2023, 3pp.

* cited by examiner

*Primary Examiner* — Qamrun Nahar
(74) *Attorney, Agent, or Firm* — HAUPTMAN HAM, LLP

(57) ABSTRACT

It is enabled that accurate estimation of a cause of why an application is unstable. A policy manager (90) estimates, when it is determined that a first application is unstable based on a stability evaluation value indicating a stability of the first application, whether the cause of why the first application is unstable lies in the first application or lies in hardware resource on which a process included in the first application is operating based on a stability evaluation value indicating a stability of a second application in which at least one process is operating on the hardware resources on which at least one process included in the first application is operating.

17 Claims, 9 Drawing Sheets

FIG.6

| |
|---|
| SERVER ID |
| LOCATION DATA |
| BUILDING DATA |
| FLOOR NUMBER DATA |
| RACK DATA |
| SPECIFICATION DATA |
| NETWORK DATA |
| OPERATING CONTAINER ID LIST |
| CLUSTER ID |

FIG.7

| | S1 | S2 | S3 | S4 |
|---|---|---|---|---|

AP1

| S1 | S2 | S3 |
|---|---|---|
| 1 | 1 | 1 |
| 2 | 2 | 2 |
| 3 | 3 | |

AP2

| S3 | S4 |
|---|---|
| 4 | 4 |
| 5 | 6 |
| 6 | 7 |
| 7 | |

AP3

| S1 | S2 | S3 | S4 |
|---|---|---|---|
| 8 | 8 | 8 | 8 |
| 9 | 10 | 9 | 9 |
| | | 10 | 10 |

AP4

| S1 |
|---|
| 11 |
| 12 |

AP4

| S4 |
|---|
| 11 |
| 12 |
| 13 |

FIG.8

| S1 | S2 | S3 | S4 | S5 |
|----|----|----|----|----|

AP1

| S2 | S3 | S5 |
|----|----|----|
| 1 | 1 | 1 |
| 2 | 2 | 2 |
| 3 | | 3 |

AP2

| S3 | S4 |
|----|----|
| 4 | 4 |
| 5 | 6 |
| 6 | 7 |
| 7 | |

AP3

| S2 | S3 | S4 | S5 |
|----|----|----|----|
| 8 | 8 | 8 | 8 |
| 10 | 9 | 9 | 9 |
| | 10 | 10 | |

AP4

| S4 | S5 |
|----|----|
| 11 | 11 |
| 12 | 12 |
| 13 | |

ESTIMATING CAUSE OF APPLICATION INSTABILITY

RELATED APPLICATIONS

The present application is a National Phase of International Application Number PCT/JP2022/048029, filed Dec. 26, 2022.

TECHNICAL FIELD

The present invention relates to estimating a cause of application instability.

BACKGROUND ART

In Patent Literature 1, it is described that a network function included in a communication system is deployed in a server in which a container-type application execution environment is installed.

CITATION LIST

Patent Literature

[Patent Literature 1] WO 2021/171210 A1

SUMMARY OF INVENTION

Technical Problem

Some applications, for example, a network function, which operate in a communication system include many processes, and those processes are dispersedly operating on a plurality of hardware resources.

In a case in which the stability of such an application is evaluated, when it is determined whether or not a process is unstable based on a stability evaluation value indicating the stability of the process for each of the many processes included in the application, the calculation amount becomes enormous.

Thus, when the stability of such an application is evaluated, it is common to determine whether or not the application is unstable based on a stability evaluation value which summarizes a plurality of processes. For example, it is determined whether or not the application is unstable based on a stability evaluation value summarizing, for each of types of processes included in the application, a plurality of processes of the type.

However, when it is determined that an application is unstable based on a stability evaluation value which summarizes a plurality of processes, because the stability evaluation value is a value summarized across a plurality of hardware resources, it is not clear from the stability evaluation value alone whether the cause of why the application is unstable is the application itself or the hardware resources.

The above-mentioned issue applies not only to applications included in communication systems, but also to general applications.

The present invention has been made in view of the above-mentioned circumstance, and has an object to enable accurate estimation of the cause of why an application is unstable.

Solution to Problem

In order to solve the above-mentioned issue, according to one embodiment of the present disclosure, there is provided a cause estimation system including: first stability evaluation value identification means for identifying a stability evaluation value indicating a stability of a first application which includes processes that are dispersedly operating on a plurality of hardware resources; second stability evaluation value identification means for identifying a stability evaluation value indicating a stability of a second application in which at least one process is operating on the hardware resources on which at least one of the processes included in the first application is operating; instability determination means for determining whether the application is unstable based on the stability evaluation value indicating the stability of the application; and cause estimation means for estimating, when it is determined that the first application is unstable based on the stability evaluation value indicating the stability of the first application, based on the stability evaluation value indicating the stability of the second application, whether a cause of why the first application is unstable lies in the first application or lies in the hardware resource on which a process included in the first application is operating.

Further, according to one embodiment present disclosure, there is provided a cause estimation method including: identifying a stability evaluation value indicating a stability of a first application which includes processes that are dispersedly operating on a plurality of hardware resources; identifying a stability evaluation value indicating a stability of a second application in which at least one process is operating on the hardware resources on which at least one of the processes included in the first application is operating; determining whether the application is unstable based on the stability evaluation value indicating the stability of the application; and estimating, when it is determined that the first application is unstable based on the stability evaluation value indicating the stability of the first application, based on the stability evaluation value indicating the stability of the second application, whether a cause of why the first application is unstable lies in the first application or lies in the hardware resource on which a process included in the first application is operating.

BRIEF DESCRIPTION OF DRAWINGS

FIG. 6 is a diagram for illustrating an example of data structure of physical inventory data.

FIG. 7 is a diagram for schematically illustrating an example of a situation in which processes included in each of a plurality of applications are dispersedly operating on a plurality of hardware resources.

FIG. 8 is a diagram for schematically illustrating an example of a situation in which processes included in each of a plurality of applications are dispersedly operating on plurality of hardware resources.

DESCRIPTION OF EMBODIMENTS

One embodiment of the present invention is now described in detail with reference to the drawings.

Figure 1:
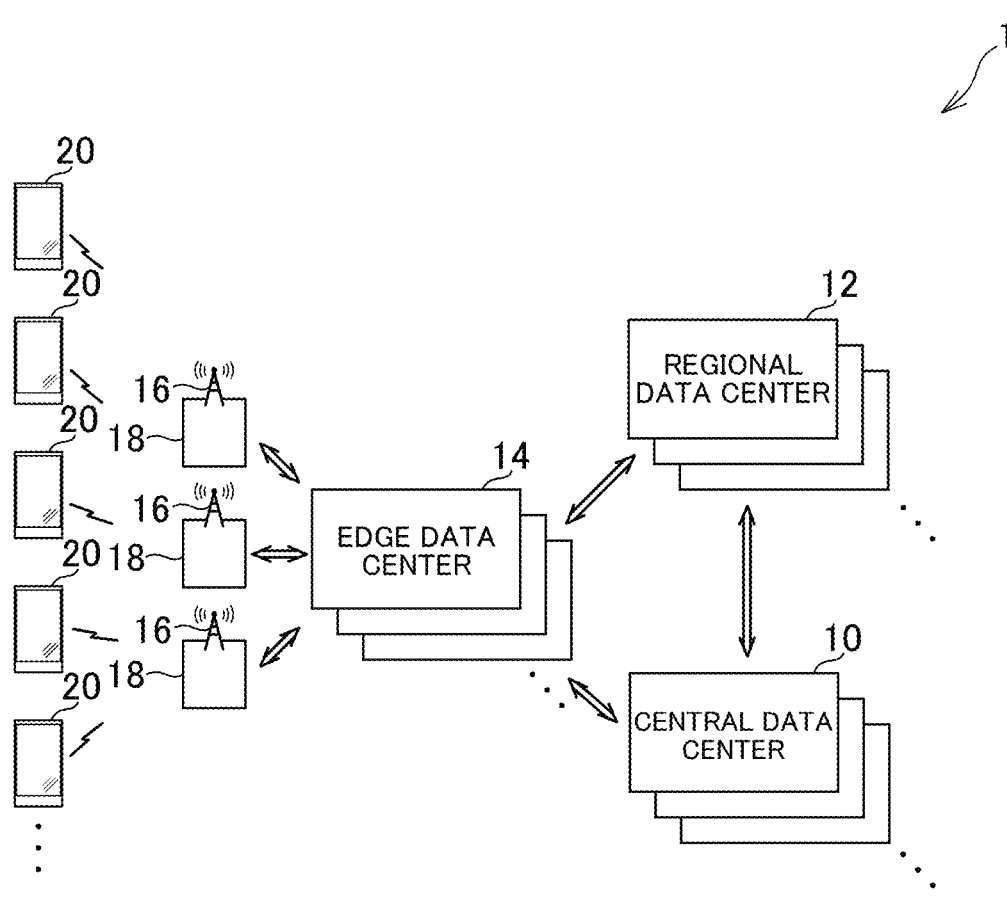
FIG. 1 is a diagram for illustrating an example of a communication system in one embodiment of the present invention.
Figure 2:
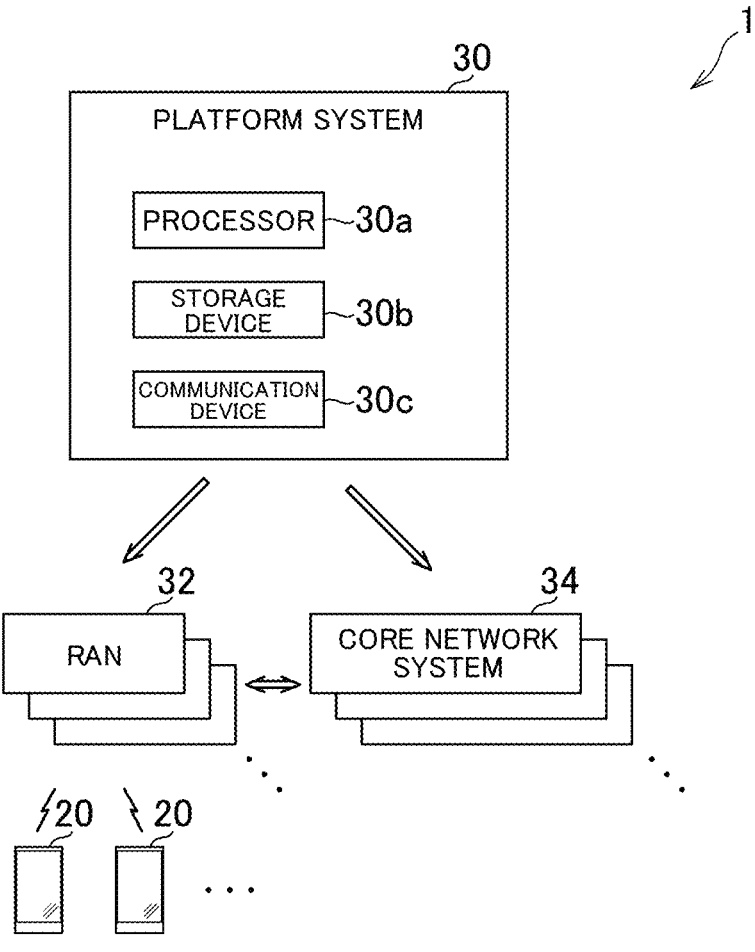
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to and from a communication facility 18 provided with an antenna 16. In this case, as illustrated in FIG. 1, one edge data center 14 may be capable of communicating to and from several communication facilities 18. The communication facility 18 may include a computer such as a server computer. The communication facility 18 in this embodiment performs radio communication to and from a user equipment (UE) 20 via the antenna 16. The communication facility 18 provided with the antenna 16 is provided with, for example, a radio unit (RU), which is described later.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate to and from one another. Communication can also be performed between the central data centers 10, between the regional data centers 12, and between the edge data centers 14.

As illustrated in FIG. 2, the communication system 1 in this embodiment includes a platform system 30, a plurality of radio access networks (RANs) 32, a plurality of core network systems 34, and a plurality of UEs 20. The core network system 34, the RAN 32, and the UE 20 cooperate with each other to implement a mobile communication network.

The RAN 32 is a computer system, which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANs 32 in this embodiment are implemented mainly by server groups arranged in the edge data centers 14 and the communication facilities 18. A part of the RAN 32 (for example, distributed unit (DU) or central unit (CU) or virtual distributed unit (vDU) or virtual central unit (vCU)) may be implemented by the central data center 10 or the regional data center 12 instead of the edge data center 14.

The core network system 34 is a system corresponding to an evolved packet core (EPC) in 4G or a 5G core (5GC) in 5G. The core network systems 34 in this embodiment are implemented mainly by server groups arranged in the central data centers 10 or the regional data centers 12.

The platform system 30 in this embodiment is configured, for example, on a cloud platform and includes a processor 30a, a storage device 30b, and a communication device 30c, as illustrated in FIG. 2. The processor 30a is a program control device such as a microprocessor which operates in accordance with a program installed in the platform system 30. The storage device 30b is, for example, a storage element such as a ROM or RAM, a solid state drive (SSD), a hard disk drive (HDD), or the like. The storage device 30b stores a program to be executed by the processor 30a, and the like. The communication device 30c is, for example, a communication interface such as a network interface controller (NIC) or a wireless local area network (LAN) module. Software-defined networking (SDN) may be implemented in the communication device 30c. The communication device 30c exchanges data with the RAN 32 and the core network system 34.

In this embodiment, the platform system 30 is implemented by a server group arranged in the central data center 10. The platform system 30 may be implemented by a server group arranged in the regional data center 12.

In this embodiment, for example, in response to a purchase request for a network service (NS) by a purchaser, the network service for which the purchase request has been made is constructed in the RAN 32 or the core network system 34. Then, the constructed network service is provided to the purchaser.

For example, service, a network such as a voice communication service, a data communication service, or the like, is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication to and from other users via the RAN 32 or the core network system 34. The UE 20 of the end user can also access a data network such as the Internet via the RAN 32 or the core network system 34.

In addition, in this embodiment, an Internet of things (IoT) service may be provided to an end user who uses a robot arm, a connected car, or the like. In this case, an end user who uses, for example, a robot arm, a connected car, or the like may be a purchaser of the network service in this embodiment.

In this embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by such a virtualization technology may be constructed. For example, a Kubernetes cluster managed by a container management tool such as Kubernetes (trademark)

may be constructed. Then, a processor on the constructed cluster may execute a container-type application.

The network service provided to the purchaser in this embodiment is formed of one or a plurality of functional units (for example, network function (NF)). In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or a plurality of CNFs. The functional unit in this embodiment may also correspond to a network node.

Figure 3:
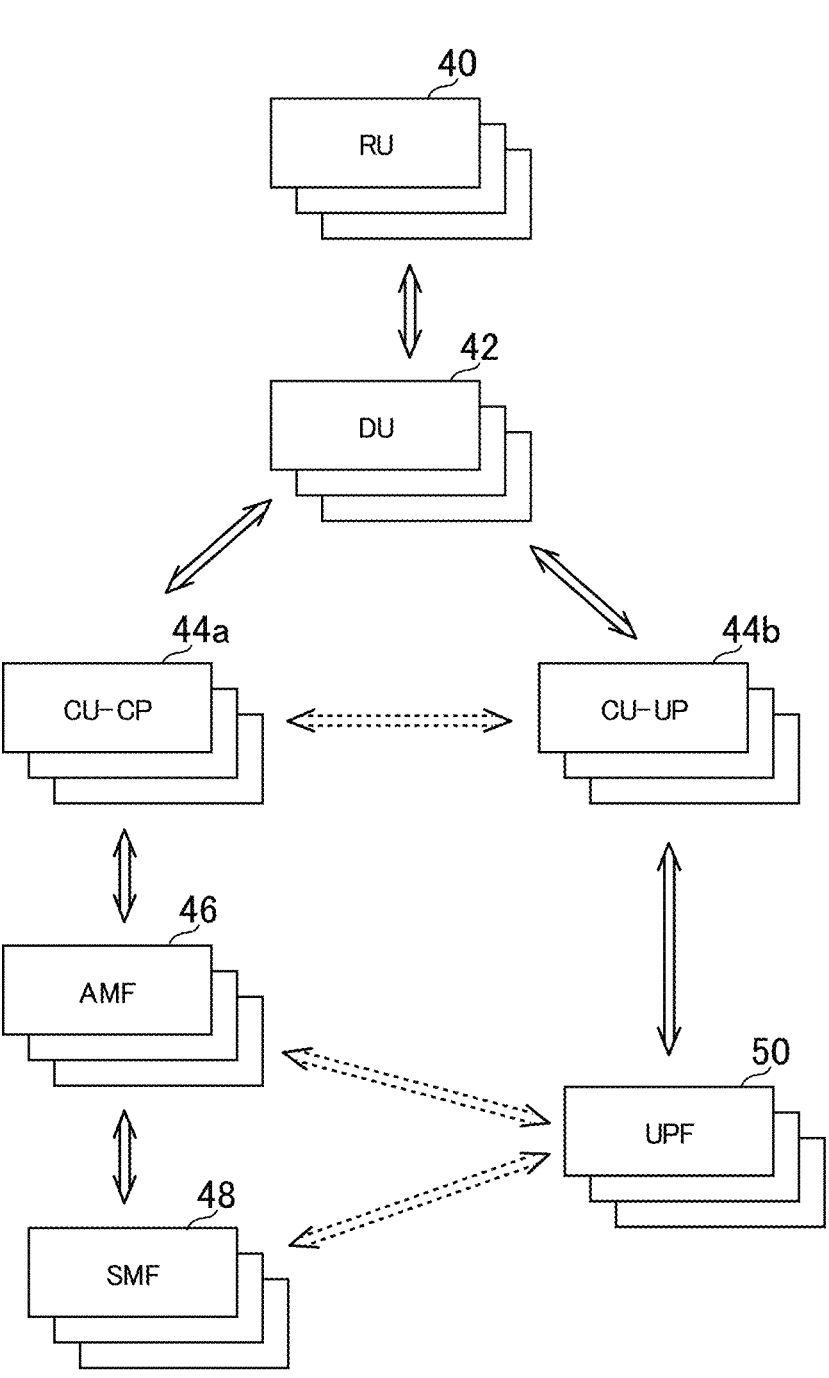
FIG. 3 is a diagram for schematically illustrating an example of a network service in the one embodiment of the present invention.

FIG. 3 is a diagram for schematically illustrating an example of an operating network service. The network service illustrated in FIG. 3 includes NFs, such as a plurality of RUs 40, a plurality of DUs 42, a plurality of CUs 44 (central unit-control planes (CU-CPs) 44a and central unit-user planes (CU-UPs) 44b), a plurality of access and mobility management functions (AMFs) 46, a plurality of session management functions (SMFs) 48, and a plurality of user plane functions (UPFs) 50, as software elements.

In the example of FIG. 3, the RUs 40, the DUs 42, the CU-CPs 44a, the AMFs 46, and the SMFs 48 correspond to elements of the control plane (C-plane), and the RUs 40, the DUs 42, the CU-UPs 44b, and the UPFs 50 correspond to elements of the user plane (U-plane).

The network service may include other types of NEs as software elements. In addition, the network service is implemented on a plurality of servers or other computer resources (hardware elements).

In this embodiment, for example, the network service illustrated in FIG. 3 provides a communication service in a certain area.

In this embodiment, it is also assumed that the plurality of RUs 40, the plurality of DUs 42, the plurality of CU-UPs 44b, and the plurality of UPFs 50, which are illustrated in FIG. 3, belong to one end-to-end network slice.

Figure 4:
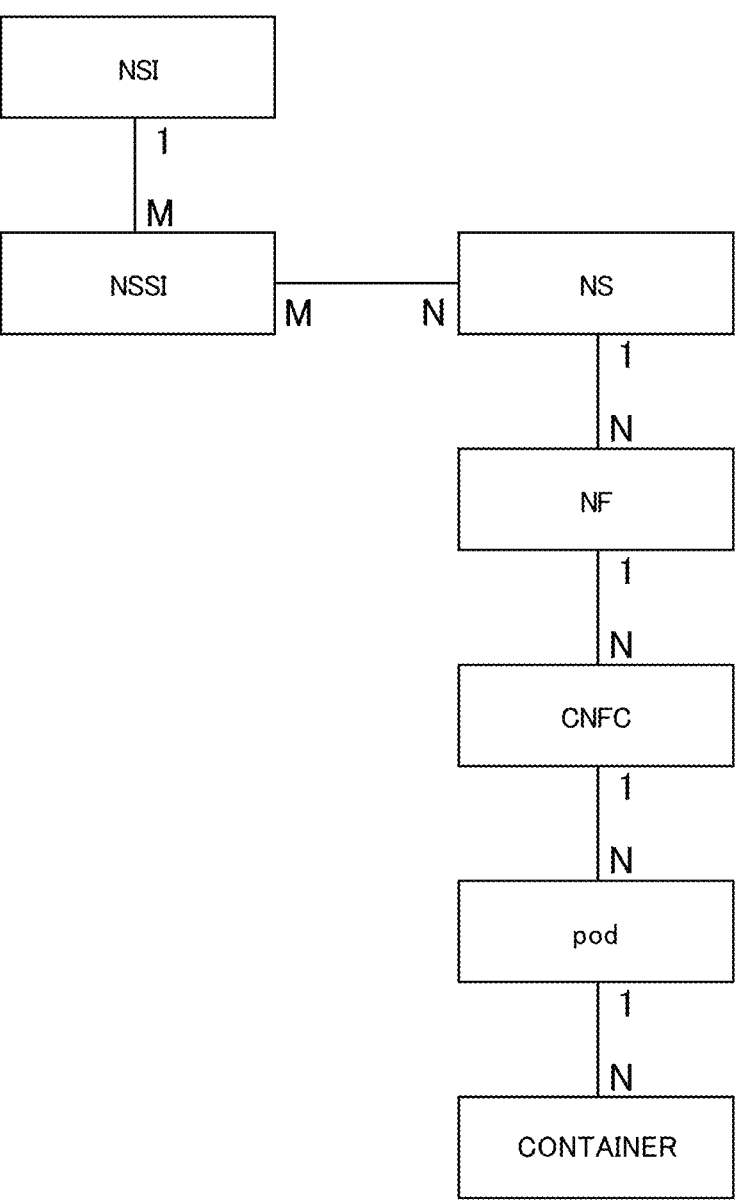
FIG. 4 is a diagram for illustrating an example of links between elements constructed in the communication system in the one embodiment of the present invention.

FIG. 4 is a diagram for schematically illustrating an example of 41 links between elements constructed in the communication system 1 in this embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB).

In 5G, the NF corresponds to an element having a granularity, such as the RU, the DU, the CU-UP, the AMF, the SMF, or the UPF. In 4G, the NF corresponds to an element having a granularity, such as a mobility management entity (MME), a home subscriber server (HSS), a serving gateway (S-GW), a vDU, or a vCU. In this embodiment, for example, one NS includes one or a plurality of NFs. That is, one or a plurality of NFs are under the control of one NS.

The CNFC corresponds to an element having a granularity, such as DU mgmt or DU processing. The CNFC may be a microservice deployed on a server as one or more containers. For example, some CNFCs may be microservices that provide a part of the functions of the DU, the CU-CP, the CU-UP, and the like. Some CNFCs may be microservices that provide a part of the functions of the UPF, the AMF, the SMF, and the like. In this embodiment, for example, one NF includes one or a plurality of CNFCs. That is, one or a plurality of CNFCs are under the control of one NF.

The pod refers to, for example, the minimum unit for managing a Docker container by Kubernetes. In this embodiment, for example, one CNFC includes one or a plurality of pods. That is, one or a plurality of pods are under the control of one CNFC.

In this embodiment, for example, one pod includes one or a plurality of containers. That is, one or a plurality of containers are under the control of one pod.

In addition, as illustrated in FIG. 4, a network slice (NSI) and a network slice subnet instance (NSSI) have a hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a transport domain such as a mobile back haul (MBH) domain, or a slice of a core network domain.

In this embodiment, for example, one NSI includes one or a plurality of NSSIs. That is, one or a plurality of NSSIs are under the control of one NSI. In this embodiment, a plurality of NSIs may share the same NSSI.

In addition, as illustrated in FIG. 4, the NSSI and the NS generally have a many-to-many relationship.

In addition, in this embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. In this case, the S-NSSAI is information associated with the network slice. The NF is not required to belong to the network slice.

Figure 5:
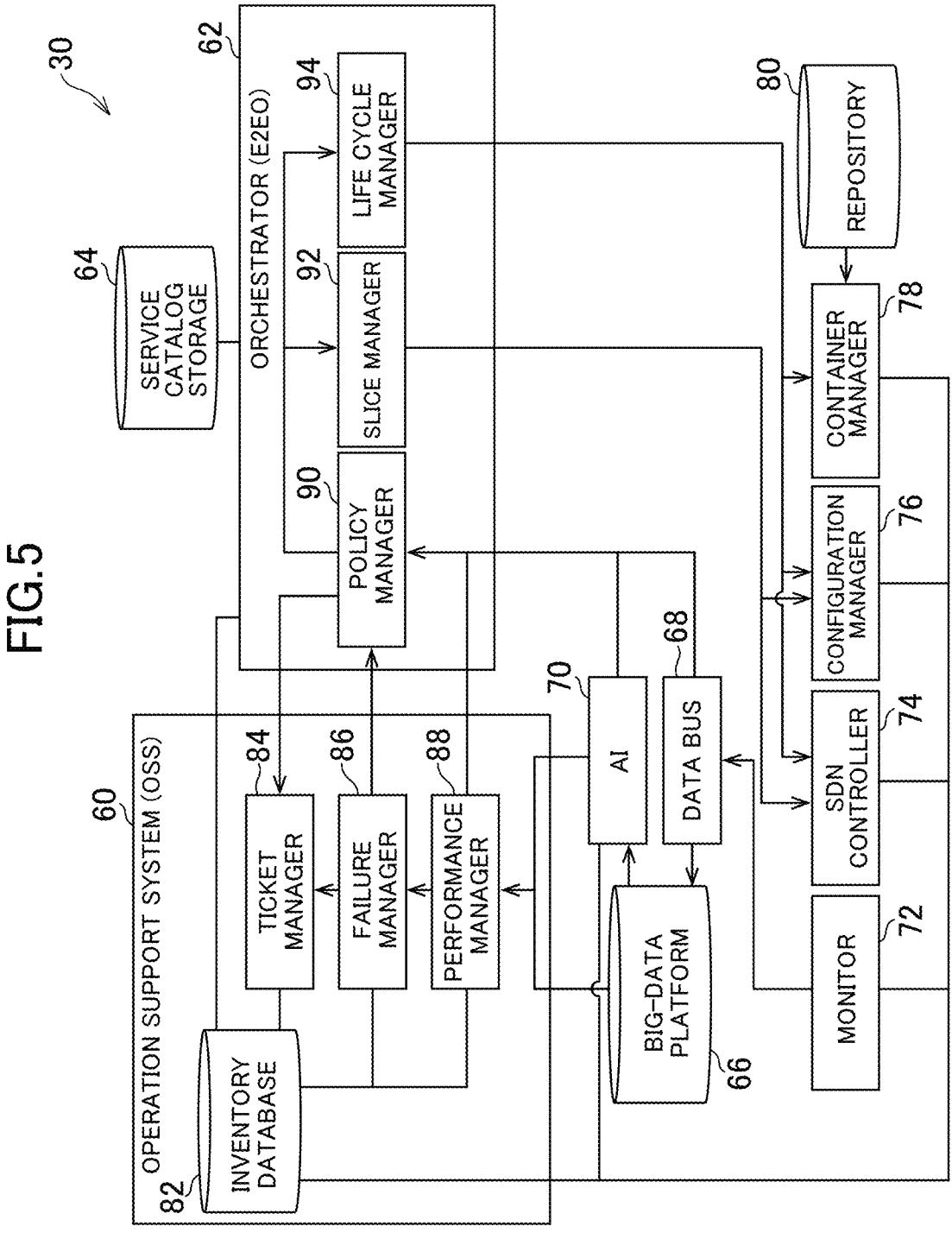
FIG. 5 is a functional block diagram for illustrating an example of functions implemented by a platform system in the one embodiment of the present invention.

FIG. 5 is a functional block diagram for illustrating an example of functions implemented by the platform system 30 in this embodiment. The platform system 30 in this embodiment is not required to implement all the functions illustrated in FIG. 5, and may implement functions other than those illustrated in FIG. 5.

As illustrated in FIG. 5, the platform system 30 in this embodiment functionally includes, for example, an operation support system (OSS) 60, an orchestrator (end-to-end-orchestrator (E2EO)) 62, a service catalog storage 64, a big-data platform 66, a data bus 68, an artificial intelligence (AI) 70, a monitor 72, an SDN controller 74, a configuration manager 76, a container manager 78, and a repository 80. The OSS 60 includes an inventory database 82, a ticket manager 84, a failure manager 86, and a performance manager 88. The E2EO 62 includes a policy manager 90, a slice manager 92, and a life cycle manager 94. Those elements are implemented mainly by the processor 30*a*, the storage device 30*b*, and the communication device 30*c*.

The functions illustrated in FIG. 5 may be implemented by executing, by the processor 30*a*, a program that is installed in the platform system 30, which is one or a plurality of computers, and that includes instructions corresponding to the functions. The program may be supplied to the platform system 30 via a computer-readable information storage medium, such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art would understand that the functions illustrated in FIG. 5 can be implemented in various forms by only hardware, by only software, or by a combination of hardware and software.

The container manager 78 executes life cycle management of a container. For example, the life cycle management includes processes relating to the construction of the container such as the deployment and setting of the container.

In this case, the platform system 30 in this embodiment may include a plurality of container managers 78. In each of the plurality of container managers 78, a container management tool such as Kubernetes, and a package manager such as Helm may be installed. Each of the plurality of container managers 78 may execute the construction of a container such as the deployment of the container for a server group (for example, Kubernetes cluster) associated with the container manager 78.

The container manager 78 is not required to be included in the platform system 30. The container manager 78 may be provided in, for example, a server (that is, the RAN 32 or the core network 34) managed by the container manager 78, or another server that is annexed to the server managed by the container manager 78.

In this embodiment, the repository 80 stores, for example, a container image of a container included in a functional unit group (for example, NF group) that implements a network service.

The inventory database 82 is a database in which inventory information is stored. The inventory information includes, for example, information on a server arranged in the RAN 32 or the core network system 34 and managed by the platform system 30.

Further, in this embodiment, the inventory database 82 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

FIG. 6 is a diagram for illustrating an example of the data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, an operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is, for example, data indicating the specifications of the server associated with the physical inventory data. The specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

The logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NFs under the control of the certain NS. In addition, for example, the logical inventory data includes topology data including an identifier of a certain network slice and an identifier of one or a plurality of NFs belonging to the certain network slice.

The inventory data may also include data indicated by the current status of, for example, a geographical relationship or a topological relationship between the elements included in the communication system 1. As described above, the inventory data includes location data indicating at which the locations elements included in the communication system 1 are operating, that is, the current locations of the elements included in the communication system 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such as an identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF. The NF data indicates, for example, attributes such as an identifier of an instance of the NF and the type of the NF. The logical inventory data may also include CNFC data indicating information relating to a CNFC. The CNFC data indicates, for example, attributes such as an identifier of an instance and the type of the CNFC. The logical inventory data may also include pod data indicating information relating to a pod included in the CNFC. The pod data indicates, for example, attributes such as an identifier of an instance of the pod and the type of the pod. The logical inventory data may also include container data indicating information relating to a container included in the pod. The container data indicates, for example, attributes such as a container ID of an instance of the container and the type of the container.

With the container ID of the container data included in the logical inventory data and the container ID included in operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the NF data may include data indicating the IP address and the host name of an NF indicated by the NF data.

The logical inventory data may also include data indicating NSSAI including one or a plurality of pieces of S-NS-SAI, which is set for each NF.

Further, the inventory database 82 can appropriately grasp the resource status in cooperation with the container manager 78. Then, the inventory database 82 appropriately updates the inventory data stored in the inventory database 82 based on the latest resource status.

Further, for example, the inventory database 82 updates the inventory data stored in the inventory database 82 in accordance with execution of an action, such as construction of a new element included in the communication system 1, a change of a configuration of the elements included in the communication system 1, scaling of the elements included in the communication system 1, or replacement of the elements included in the communication system 1.

The service catalog storage 64 stores service catalog data. The service catalog data may include, for example, service template data indicating the logic to be used by the life cycle manager 94 or the like. The service template data includes information required for constructing the network service. For example, the service template data includes information defining the NS, the NF, and the CNFC and information indicating an NS-NF-CNFC correspondence relationship. Further, for example, the service template data contains a workflow script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNFs or other functional units included in the network service for each type thereof. The NSD may also indicate a file name of a CNFD described later, which relates to the CNF included in the network service.

Further, a CNF descriptor (CNFD) is an example of the above-mentioned service template data. The CNFD may indicate computer resources (for example, CPU, memory, and hard disk drive) required by the CNF. For example, the CNFD may also indicate, for each of a plurality of containers included in the CNF, computer resources (such as CPU, memory, and hard disk drive) required by the container.

The service catalog data may also include information to be used by the policy manager 90, the information relating to a threshold value (for example, threshold value for abnormality detection) to be compared to the calculated performance index value. The performance index value is described later.

The service catalog data may also include, for example, slice template data. The slice template data includes information required for executing instantiation of the network slice, and includes, for example, the logic to be used by the slice manager 92.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In this embodiment, for example, the life cycle manager 94 constructs a new network service for which a purchase request has been made in response to the purchase request for the NS by the purchaser.

The life cycle manager 94 may execute, for example, the workflow script associated with the network service to be purchased in response to the purchase request. Then, the life cycle manager 94 may execute the workflow script, to thereby instruct the container manager 78 to deploy the container included in the new network service to be purchased. Then, the container manager 78 may acquire the container image of the container from the repository 80 and deploy a container corresponding to the container image in the server.

In addition, in this embodiment, the life cycle manager 94 executes, for example, scaling or replacement of the element included in the communication system 1. In this case, the life cycle manager 94 may output a container deployment instruction or deletion instruction to the container manager 78. Then, the container manager 78 may execute, for example, a process for deploying a container or a process for deleting a container in accordance with the instruction. In this embodiment, the life cycle manager 94 can execute such scaling and replacement that cannot be handled by Kubernetes of the container manager 78 or other tools.

The life cycle manager 94 may also output an instruction to create a communication route to the SDN controller 74. For example, the life cycle manager 94 presents, to the SDN controller 74, two IP addresses at both ends of a communication route to be created, and the SDN controller 74 creates a communication route connecting those two IP addresses to each other. The created communication route may be managed so as to be linked to those two IP addresses.

The life cycle manager 94 may also output to the SDN controller 74 an instruction to create a communication route between two IP addresses linked to the two IP addresses.

In this embodiment, the slice manager 92 executes, for example, instantiation of a network slice. In this embodiment, the slice manager 92 executes, for example, instantiation of a network slice by executing the logic indicated by the slice template stored in the service catalog storage 64.

The slice manager 92 includes, for example, a network slice management function (NSMF) and a network slice sub-network management function (NSSMF) described in the third generation partnership project (3GPP) (trademark) specification "TS28 533." The NSMF is a function for generating and managing network slices, and provides an NSI management service. The NSSMF is a function for generating and managing network slice subnets forming a part of a network slice, and provides an NSSI management service.

The slice manager 92 may output to the configuration manager 76 a configuration management instruction related to the instantiation of the network slice. Then, the configuration manager 76 may execute configuration management such as settings in accordance with the configuration management instruction.

The slice manager 92 may also present, to the SDN controller 74, two IP addresses to output an instruction to create a communication route between those two IP addresses.

In this embodiment, for example, the configuration manager 76 executes configuration management such as settings of the element group including the NFs in accordance with the configuration management instruction received from the life cycle manager 94 or the slice manager 92.

In this embodiment, for example, the SDN controller 74 creates the communication route between the two IP addresses linked to the creation instruction in accordance with the instruction to create the communication route, which has been received from the life cycle manager 94 or the slice manager 92. The SDN controller 74 may create a communication route between two IP addresses through use of, for example, a publicly known path calculation method such as Flex Algo.

In this case, for example, the SDN controller 74 may use segment routing technology (for example, segment routing IPV6 to construct an NSI and NSSI for the server or an aggregation router present between communication routes. The SDN controller 74 may also generate an NSI and NSSI extending over a plurality of NFs to be set by issuing, to the plurality of NFs to be set, a command to set a common virtual local area network (VLAN) and a command to assign a bandwidth and a priority indicated by the setting information to the VLAN.

The SDN controller 74 may change the maximum value of the bandwidth that can be used for communication between two IP addresses without constructing a network slice.

The platform system 30 in this embodiment may include a plurality of SDN controllers 74. Each of the plurality of SDN controllers 74 may execute a process such as the creation of a communication route for a network device group including the AGs associated with the SDN controller 74.

In this embodiment, the monitor 72 monitors, for example, the element group included in the communication system 1 based on a given management policy. In this case, for example, the monitor 72 may monitor the element group based on a monitoring policy designated by the purchaser when the purchaser purchases the network service.

In this embodiment, the monitor 72 executes monitoring at various levels, such as a slice level, an NS level, an NF level, a CNFC level, and a level of hardware such as the server.

For example, the monitor 72 may set a module for outputting metric data in the hardware such as the server, or a software element included in the communication system 1 so that monitoring can be performed at the various levels described above. In this case, for example, the NF may output the metric data indicating a metric that can be measured (can be identified) by the NF to the monitor 72. Further, the server may output the metric data indicating a metric relating to the hardware that can be measured (can be identified) by the server to the monitor 72.

In addition, for example, the monitor 72 may deploy, in the server, a sidecar container for aggregating the metric data indicating the metrics output from a plurality of containers in units of CNFCs (microservices). The sidecar container may include an agent called "exporter." The monitor 72 may repeatedly execute a process for acquiring the metric data aggregated in units of microservices from the sidecar container, at predetermined monitoring intervals through use of a mechanism of a monitoring tool, for example, Prometheus capable of monitoring the container management tool such as Kubernetes.

The monitor 72 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitor 72 may acquire metric data indicating the performance index values to be monitored.

In this embodiment, for example, the monitor 72 executes a process (enrichment) for aggregating metric data in predetermined units of aggregation to generate performance index value data indicating the performance index values of the elements included in the communication system 1 in the units of aggregation.

For example, for one gNB, the metric data indicating the metrics of the elements under control of the gNB (for example, network nodes such as DUs 42 and CUs 44) is aggregated to generate the performance index value data of the gNB. In this way, performance index value data indicating a communication performance in the area covered by the gNB is generated. For example, performance index value data indicating a plurality of types of communication performance, such as traffic amount (throughput) and latency, may be generated in each gNB. However, the communication performance indicated by the performance index value data is not limited to traffic amount and latency.

The monitor 72 outputs the performance index value data generated by the above-mentioned enrichment to the data bus 68.

In this embodiment, for example, the data bus 68 receives the performance index value data output from the monitor 72. Based on the received one or a plurality of pieces of performance index value data, the data bus 68 generates a performance index value file including the one or a plurality of pieces of performance index value data. The data bus 68 then outputs the generated performance index value file to the big-data platform 66.

In this embodiment, for example, the monitor 72 executes, for each application, a process (enrichment) for aggregating the metric data relating to the application to identify a stability evaluation value indicating the stability of the application. The monitor 72 then generates stability evaluation value data indicating the identified stability evaluation value.

The monitor 72 then outputs the generated stability evaluation value data to the data bus 68.

In this embodiment, for example, the data bus 68 receives the stability evaluation value data output from the monitor 72.

Further, the elements such as the network slice, the NS, the NF, the CNFC that are included in the communication system 1 and the hardware such as the server notify the monitor 72 of various alerts (for example, notify the monitor 72 of an alert with the occurrence of a failure as a trigger).

Then, for example, when the monitor 72 receives the above-mentioned notification of the alert, the monitor 72 outputs alert message data indicating the notification to the data bus 68. Then, the data bus 68 generates an alert file in which alert message data indicating one or a plurality of notifications are compiled into one file, and outputs the generated alert file to the big-data platform 66.

In this embodiment, the big-data platform 66 accumulates, for example, the performance index value file and the alert file that have been output from the data bus 68.

In this embodiment, for example, a plurality of trained machine learning models are stored in the AI 70 in advance. The AI 70 uses various machine learning models stored in the AI 70 to execute an estimation process such as a future prediction process for a use status and quality of service of the communication system 1. The AI 70 may generate estimation result data indicating results of the estimation process.

The AI 70 may execute the estimation process based on the files accumulated in the big-data platform 66 and the above-mentioned machine learning model. The estimation process is suitable when prediction of a long-term trend is performed infrequently.

Further, the AI 70 can acquire performance index value data stored in the data bus 68. The AI 70 may execute the estimation process based on the performance index value data stored in the data bus 68 and the above-mentioned machine learning model. The estimation process is suitable when short-term predictions are performed frequently.

In this embodiment, for example, the performance manager 88 calculates, based on a plurality of pieces of metric data, a performance index value (for example, KPI) that is based on metrics indicated by those pieces of metric data. The performance manager 88 may calculate a performance index value (for example, performance index value relating to an end-to-end network slice) which is a comprehensive evaluation of a plurality of types of metrics and cannot be calculated from a single piece of metric data. The performance manager 88 may generate comprehensive performance index value data indicating a performance index value being a comprehensive evaluation.

The performance manager 88 may acquire the above-mentioned performance index value file from the big-data platform 66. Further, the performance manager 88 may acquire estimation result data from the AI 70. A performance index value such as a KPI may be calculated based on at least one of the performance index value file or the estimation result data. The performance manager 88 may directly acquire metric data from the monitor 72. Further, the performance index value such as a KPI may be calculated based on the metric data.

In this embodiment, the failure manager 86 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure manager 86 may detect, for example, the occurrence of a failure that cannot be detected from a single piece of metric data or a single notification of the alert, based on a predetermined logic. The failure manager 86 may also generate detection failure data indicating the detected failure.

The failure manager 86 may directly acquire the metric data and the notification of the alert from the monitor 72. The failure manager 86 may also acquire the performance index value file and the alert file from the big-data platform 66. Further, the failure manager 86 may acquire the alert message data from data bus 68.

In this embodiment, the policy manager 90 executes a predetermined determination process based on, for example, at least any one of the above-mentioned metric data, the above-mentioned performance index value data, the above-mentioned stability evaluation value data, the above-mentioned alert message data, the above-mentioned performance index value file, the above-mentioned alert file, the above-mentioned estimation result data, the above-mentioned comprehensive performance index value data, or the above-mentioned detection failure data.

Then, the policy manager 90 may execute an action corresponding to a result of the determination process. For example, the policy manager 90 may output an instruction to construct a network slice to the slice manager 92. The policy manager 90 may also output an instruction for scaling or replacement of the elements to the life cycle manager 94 based on the result of the determination process.

The policy manager 90 in this embodiment can acquire the performance index value data stored in the data bus 68. The policy manager 90 may then execute a predetermined determination process based on the performance index value data acquired from the data bus 68. The policy manager 90 may also execute a predetermined determination process based on the alert message data stored in the data bus 68.

Further, the policy manager 90 in this embodiment can acquire the stability evaluation value data stored in the data bus 68. The policy manager 90 may then execute a predetermined determination process based on the stability evaluation value data acquired from the data bus 68. For example, the policy manager 90 may determine whether or not an application is unstable based on the stability evaluation value data indicating the stability of the application.

In this embodiment, the ticket manager 84 generates, for example, a ticket indicating information to be notified to an administrator of the communication system 1. The ticket manager 84 may generate a ticket indicating details of the detection failure data. The ticket manager 84 may also generate a ticket indicating a value of the performance index value data, the stability evaluation value data, or the metric data. The ticket manager 84 may also generate a ticket indicating a determination result obtained by the policy manager 90.

Then, the ticket manager 84 notifies the administrator of the communication system 1 of the generated ticket. The ticket manager 84 may send, for example, an email to which the generated ticket is attached to an email address of the administrator of the communication system 1.

As described above, in this embodiment, the policy manager 90 determines whether or not an application is unstable based on the stability evaluation value indicating the stability of the application. When it is determined that an application is unstable, the policy manager 90 estimates the cause of why the application is unstable. For example, the policy manager 90 estimates whether the cause of why the application is unstable lies in the application itself or lies in the hardware resource on which a process included in the application is operating.

The process may be, for example, an execution unit (for example, a pod) of the application in a container-type virtualized application execution environment.

Further, the application may be a network function (for example, DU 42, CU-CP 44*a*, CU-UP 44*b*, AMF 46, SMF 48, UPF 50, and the like).

The process for estimating the cause of why an application is unstable is now described in more detail.

In this embodiment, for example, as described above, the monitor 72 calculates, for each of the plurality of applications included in the communication system 1, a stability index value indicating the stability of the application. Those applications include a plurality of types of processes. For each type of process, a plurality of processes of the type operate in order for the overall application to operate. Further, for each type of process, the processes of the type are dispersedly operating on a plurality of hardware resources.

Figure 7:
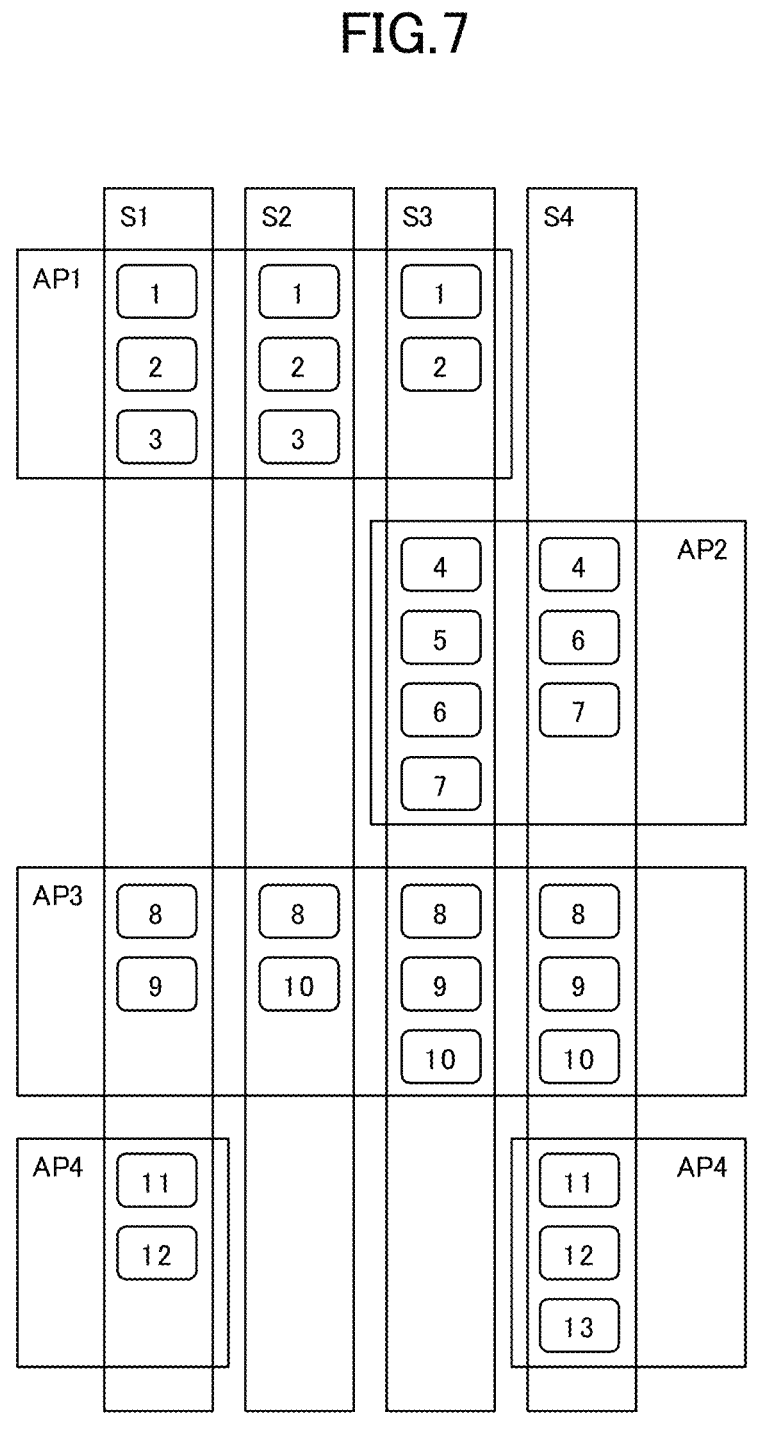

FIG. 7 is a diagram for schematically illustrating an example of a situation in which processes included in each of a plurality of applications are dispersedly operating on a plurality of hardware resources.

In the example of FIG. 7, a situation in which four applications having the identifiers AP1, AP2, AP3, and AP4, respectively, are operating is illustrated.

In this embodiment, for each type of application, the hardware resources on which the type of application can operate are determined in advance. In the following description, the hardware resources are assumed to be servers, but it is not required that the hardware resources be servers, and the hardware resources may be, for example, nodes.

The hardware resources on which a type of application can operate are hereinafter referred to as "tenant" corresponding to the application.

In FIG. 7, four servers having the identifiers S1, S2, S3, and S4, respectively, are illustrated. Those four servers belong to one cluster (for example, a Kubernetes cluster).

Further, the four applications illustrated in FIG. 7 are each of a different type. It is assumed that the tenants corresponding to the application having the identifier AP1 include servers having the identifiers S1, S2, and S3. It is also assumed that the tenants corresponding to the application having the identifier AP2 include servers having the identifiers S3 and S4. It is also assumed that the tenants corresponding to the application having the identifier AP3 include servers having the identifiers S1, S2, S3, and S4. It is also assumed that the tenants corresponding to the application having the identifier AP4 include servers having the identifiers S1 and S4.

Each rounded rectangular shape illustrated in FIG. 7 corresponds to one process (for example, a pod). The numbers illustrated in the rounded rectangle shapes are the identifiers associated with the type of the process. That is, rounded rectangles having the same number correspond to the same type of process.

As illustrated in FIG. 7, the application having the identifier AP1 includes three types of processes having the identifiers 1, 2, and 3. Three processes of the type having the identifier 1 are operating on the servers having the identifiers S1, S2, and S3, respectively. Three processes of the type having the identifier 2 are operating on the servers having the identifiers of S1, S2, and S3, respectively. Two processes of the type having the identifier 3 are operating on the servers having the identifiers S1 and S2, respectively.

Further, the application having the identifier AP2 includes four types of processes having the identifiers 4, 5, 6, and 7. Two processes of the type having the identifier 4 are operating on the servers having the identifiers S3 and S4, respectively. One process of the type having the identifier 5 is operating on the server having the identifier S3. Two processes of the type having the identifier 6 are operating on the servers having the identifiers S3 and S4, respectively. Two processes of the type having the identifier 7 are operating on the servers having the identifiers S3 and S4, respectively.

Further, the application having the identifier AP3 includes three types of processes having the identifiers 8, 9, and 10. Four processes of the type having the identifier 8 are operating on the servers having the identifiers S1, S2, S3 and S4, respectively. Three processes of the type having the identifier 9 is operating on the servers having the identifier S1, S3, and S4. Three processes of the type having the identifier 10 are operating on the servers having the identifiers S2, S3 and S4, respectively.

Further, the application having the identifier AP4 includes three types of processes having the identifiers 11, 12, and 13. Two processes of the type having the identifier 11 are operating on the servers having the identifiers S1 and S4, respectively. Two processes of the type having the identifier 12 are operating on the servers having the identifiers S1 and S4, respectively. One process of the type having the identifier 13 is operating on the server having the identifier S4.

In this embodiment, for example, each type of process is controlled by the container manager 78 so as to be dispersedly operating on as many hardware resources as possible.

In this embodiment, for example, the monitor 72 acquires, for each type of process, a value (metric) indicating the stability of the type of process. For example, in this case, metrics such as a value indicating a status of the process (for example, kube_pod_status_ready), a time at which the process started (for example, kube_pod_start_time), a length of time for which the process has executed input and output (for example, container_fs_io_time_seconds_total), the number of transmitted packets dropped by the process (for example, container_network_transmit_packets_dropped_total), the number of received packets dropped by the process (for example, container_network_receive_packets_dropped_total) may be acquired.

Then, the monitor 72 calculates a weighted sum of the acquired plurality of types of metrics based on a weighting associated with those types as the stability evaluation value indicating the stability of the type of process. In this case, for example, the weighting of each type of metric may be determined in advance for each type of process. Further, a weighted sum of the acquired metrics based on a weighting determined in advance may be calculated as the stability evaluation value indicating the stability of the type of process. The stability evaluation value indicating the stability of a process is hereinafter referred to as "process stability evaluation value." For example, in the example of FIG. 7, the process stability evaluation value is calculated for each of the types of processes having the identifiers 1 to 13.

Then, the monitor 72 identifies the stability evaluation value indicating the stability of the application based on a process stability evaluation value, which is acquired for each type of process included in the application, relating to the type of process. The stability evaluation value indicating the stability of the application is hereinafter referred to as "application stability evaluation value." For example, for each application, the monitor 72 calculates the application stability evaluation value of the application based on the process stability evaluation values calculated for the processes included in the application.

The application stability evaluation value may be identified based on at least one of a status of the processes included in the application, a lifetime of the processes included in the application, a length of time for which the processes included in the application have executed input and output, or a number of packets dropped by the processes included in the application. The lifetime of a process is identifiable based on a value indicating the start time of the process, for example.

The monitor 72 may calculate the application stability evaluation value indicating the stability of an application in accordance with a rule associated with the type of the application. For example, a mathematical expression may be predetermined for each type of application. Further, the application stability evaluation value of the application may be calculated by applying the process stability evaluation value, which is acquired for each type of process included in the application, relating to the type of process to the mathematical expression.

For example, the application stability evaluation value of the application having the identifier AP1 is calculated based on the process stability evaluation values of the types of processes having the identifiers 1 to 3. Further, the application stability evaluation value of the application having the identifier AP2 is calculated based on the process stability evaluation values of the types of processes having the identifiers 4 to 7. In addition, the application stability evaluation value of the application having the identifier AP3 is calculated based on the process stability evaluation values of the types of processes having the identifiers 8 to 10. Moreover, the application stability evaluation value of the application having the identifier AP4 is calculated based on the process stability evaluation values of the types of processes having the identifiers 11 to 13.

Then, for each of the plurality of applications, the monitor 72 generates stability evaluation value data indicating the application stability evaluation value calculated for the application, and outputs the generated stability evaluation value data to the data bus 68. In this embodiment, for example, the monitor 72 generates the stability evaluation value data at predetermined time intervals based on the most recent situation. The monitor 72 outputs the stability evaluation value data to the data bus 68 each time the stability evaluation value data is generated.

When the stability evaluation value data is output to the data bus 68, the policy manager 90 acquires the stability evaluation value data. The policy manager 90 then identifies the application stability evaluation value indicated by the acquired stability evaluation value data. In this way, the policy manager 90 identifies, for each of the plurality of applications, the stability evaluation value indicating the stability of the application. Further, as described above, the processes included in those applications are dispersedly operating on a plurality of hardware resources.

The policy manager 90 then determines, for each of the plurality of applications, whether or not the application is unstable based on the stability evaluation value indicating the stability of the application. For example, as the application becomes more unstable, the application stability evaluation value becomes smaller. In this case, the policy manager 90 determines that an application is unstable, for example, when the application stability evaluation value is smaller than a threshold value associated with the type of the application.

For example, in a case in which the policy manager 90 has determined that a first application (for example, application having the identifier AP1) is unstable, the policy manager 90 identifies the stability evaluation value indicating the stability of a second application in which at least one process is operating on the hardware resource on which at least one process included in the first application is operating.

In the example of FIG. 7, the servers on which the processes included in the first application are operating are the three servers having the identifiers S1, S2, and S3. In the server having the identifier S1, in addition to the processes included in the application having the identifier AP1, the processes included in the application having the identifier AP3 and the processes included in the application having the identifier AP4 are operating.

Further, in the server having the identifier S2, in addition to the processes included in the application having the identifier AP1, the processes included in the application having the identifier AP3 are operating.

Further, in the server having the identifier S3, in addition to the processes included in the application having the identifier AP1, the processes included in the application having the identifier AP2 and the processes included in the application having the identifier AP3 are operating.

Accordingly, in this case, the three applications having the identifiers AP2, AP3, and AP4 correspond to the above-mentioned second application. Thus, there may be a plurality of second applications.

Thus, in this case, the policy manager 90 identifies the application stability evaluation value for each of the three applications having the identifiers AP2, AP3, and AP4.

When the first application is determined to be unstable based on the stability evaluation value indicating the stability of the first application, the policy manager 90 estimates, based on the stability evaluation value indicating the stability of the second application, whether the cause of why the first application is unstable lies in the first application or lies in the hardware resource on which a process included in the first application is operating.

When it is determined that the second application is not unstable based on the stability evaluation value indicating the stability of the second application, the policy manager 90 may estimate that the cause of why the first application is unstable lies in the first application.

For example, when it is determined that the application having the identifier AP2 is not unstable, it may be estimated that the cause of why the application having the identifier AP1 is unstable lies in the application itself. As another example, when it is determined that the application having the identifier AP3 is not unstable, it may be estimated that the cause of why the application having the identifier AP1 is unstable lies in the application itself. As still another example, when it is determined that the application having the identifier AP4 is not unstable, it may be estimated that the cause of why the application having the identifier AP1 is unstable lies in the application itself.

Further, when it is determined that the second application is unstable based on the stability evaluation value indicating the stability of the second application, the policy manager 90 may estimate that the cause of why the first application is unstable lies in the hardware resource on which a process included in the first application is operating.

For example, when it is determined that the application having the identifier AP2 is unstable, it may be estimated that the cause of why the application having the identifier AP1 is unstable lies in the server having the identifier S3. As another example, when it is determined that the application having the identifier AP3 is unstable, it may be estimated that the cause of why the application having the identifier AP1 is unstable lies in the server having the identifier S1, S2, or S3. As still another example, when it is determined that the application having the identifier AP4 is not unstable, it may be estimated that the cause of why the application having the identifier AP1 is unstable lies in the server having the identifier S1.

In addition, the policy manager 90 may estimate whether the cause of why the first application is unstable lies in the first application or lies in the hardware resource based on at least one of the number of applications determined to be unstable or the number of applications determined to be not unstable among the plurality of applications operating on any one of the hardware resources on which any one of the processes included in the first application is operating.

In this case, the policy manager 90 may estimate that the cause of why the first application is unstable lies in the hardware resources in which the number of applications determined to be unstable is equal to or more than a predetermined number of two or more.

For example, assuming that the predetermined number is 3, in this case, when it is determined that the three applications having the identifiers AP1, AP3, and AP4 are unstable, it may be estimated that the cause of why the first application is unstable lies in the server having the identifier S1. Further, when it is determined that the three applications having the identifiers AP1, AP2, and AP3 are unstable, it may be estimated that the cause of why the first application is unstable lies in the server having the identifier S3. When none of those cases is true, it may be estimated that the cause of why the first application is unstable lies in the application itself.

As another example, the policy manager 90 may estimate that the cause of why the first application is unstable lies in the hardware resource in which a ratio of the number of applications determined to be unstable with respect to the number of applications operating on the hardware resource is equal to or more than a predetermined value.

For example, assuming that the predetermined value is 60%, in this case, when it is determined that 60% or more of the applications operating on the server having the identifier S1 are unstable, it may be estimated that the cause of why the first application is unstable lies in the server having the identifier S1. As another example, when it is determined that 60% or more of the applications operating on the server having the identifier S2 are unstable, it may be estimated that the cause of why the first application is unstable lies in the server having the identifier S2. As still another example, when it is determined that 60% or more of the applications operating on the server having the identifier S3 are unstable, it may be estimated that the cause of why the first application is unstable lies in the server having the identifier S3. When none of those cases is true, it may be estimated that the cause of why the first application is unstable lies in the application itself.

Further, when it is determined that all of the applications operating on any one of the hardware resources on which a process included in the first application is operating are unstable, the policy manager 90 may estimate that the cause of why the first application is unstable lies in the hardware resource.

For example, when it is determined that all of the applications (the three applications having the identifiers AP1, AP3, and AP4) having a process operating on the server having the identifier S1 are unstable, it may be estimated that the cause of why the first application is unstable lies in the server having the identifier S1. As another example, when it is determined that all of the applications (the two applications having the identifiers AP1 and AP3) having a process operating on the server having the identifier S2 are unstable, it may be estimated that the cause of why the first application is unstable lies in the server having the identifier S2. As still another example, when it is determined that all of the applications (the three applications having the identifiers AP1, AP2, and AP3) having a process operating on the server having the identifier S3 are unstable, it may be estimated that the cause of why the first application is unstable lies in the server having the identifier S3. When none of those cases is true, it may be estimated that the cause of why the first application is unstable lies in the application itself.

In this case, when it is determined that the three applications having the identifiers AP1, AP3, and AP4 are unstable, it may be estimated that the cause of why the first application is unstable lies in the server having the identifier S1 or S2. Further, when it is determined that the three applications having the identifiers AP1, AP2, and AP3 are unstable, it may be estimated that the cause of why the first application is unstable lies in the server having the identifier S2 or S3.

Further, when it is determined that the three applications having the identifiers AP1, AP3, and AP4 are unstable, it may be estimated that the cause of why the first application is unstable lies in the server having the identifier S1 and the server having the identifier S2. Further, when it is determined that the three applications having the identifiers AP1, AP2, and AP3 are unstable, it may be estimated that the cause of why the first application is unstable lies in the server having the identifier S2 and the server having the identifier S3.

In this way, it is estimated whether or not the cause of why the first application is unstable lies in the first application itself or the hardware resource on which a process included in the first application is operating.

Then, the policy manager 90 executes an action corresponding to the estimated cause.

In this case, the policy manager 90 may replace the first application. For example, when it is estimated that the cause of why the application having the identifier AP1 is unstable lies in the application itself, the application may be replaced by a server in another cluster or another server in the same cluster. For example, the tenant settings of the application may be changed.

Further, the policy manager 90 may separate a hardware resource from a cluster created by virtualization technology. For example, when it is estimated that the cause of why the application having the identifier AP1 is unstable lies in the server having the identifier S1, the server may be separated from the cluster to which the server belongs.

Figure 8:
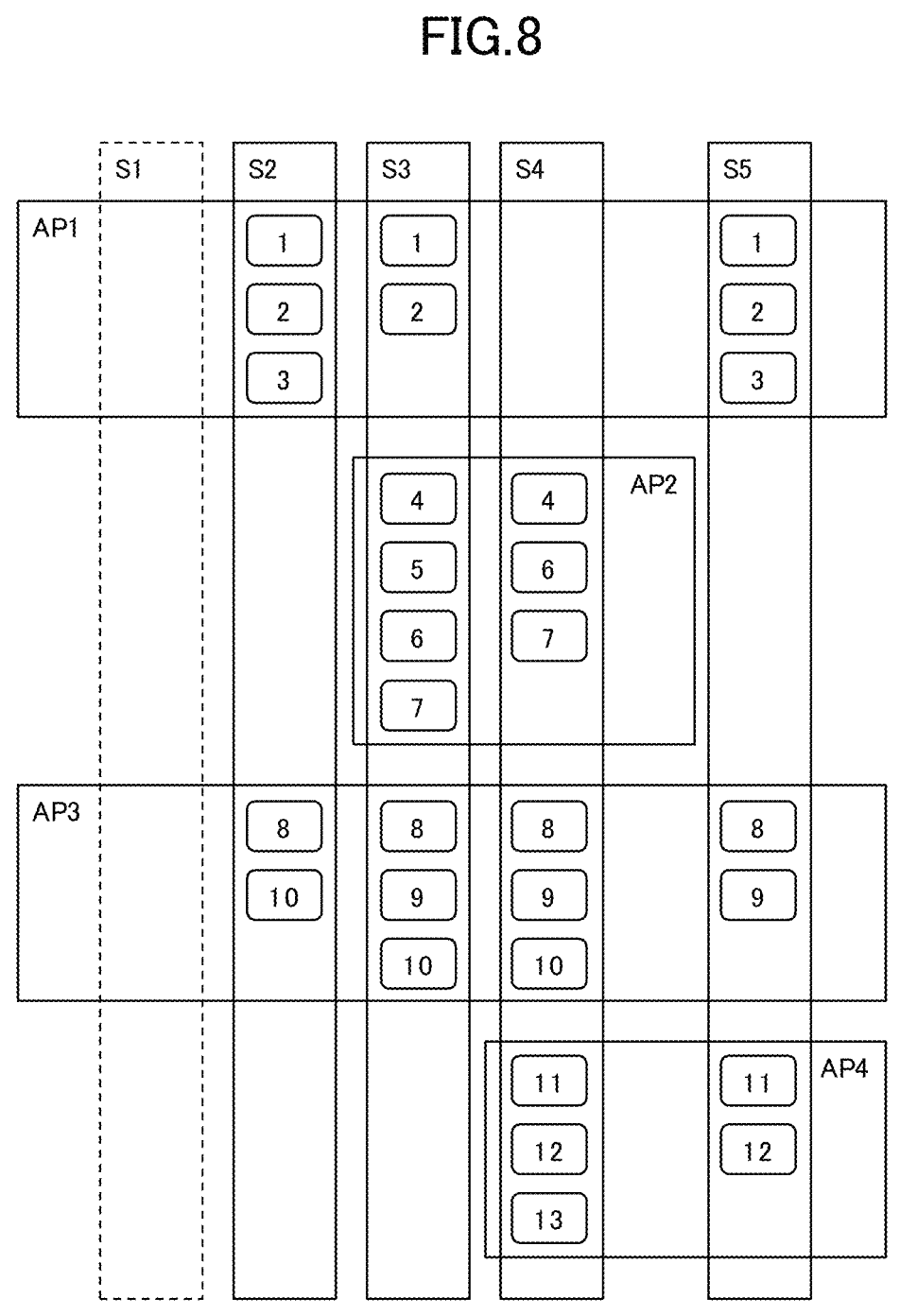

For example, as illustrated in FIG. 8, a new server having the identifier S5 may be added to the cluster to which the servers having the identifiers S1 to S4 belong. Further, the tenant settings for AP1, AP3, and AP4 may be changed. For example, the server having the identifier S1 may be removed as a tenant, and the server having the identifier S5 may be added as a tenant. Then, the server having the identifier S1 may be separated from the cluster to which the server belongs. In this manner, as illustrated in FIG. 8, the container manager 78 can operate processes on the server having the identifier S5 as required.

Further, in this embodiment, the monitor 72 may calculate, based on the stability evaluation values of the applications operating in one cluster, a stability evaluation value of the cluster.

In addition, the policy manager 90 may determine whether or not the cluster is unstable based on the stability evaluation value of the cluster. When it is determined that the cluster is unstable, the policy manager 90 may replace all of the applications operating in the cluster by another cluster.

Figure 9:
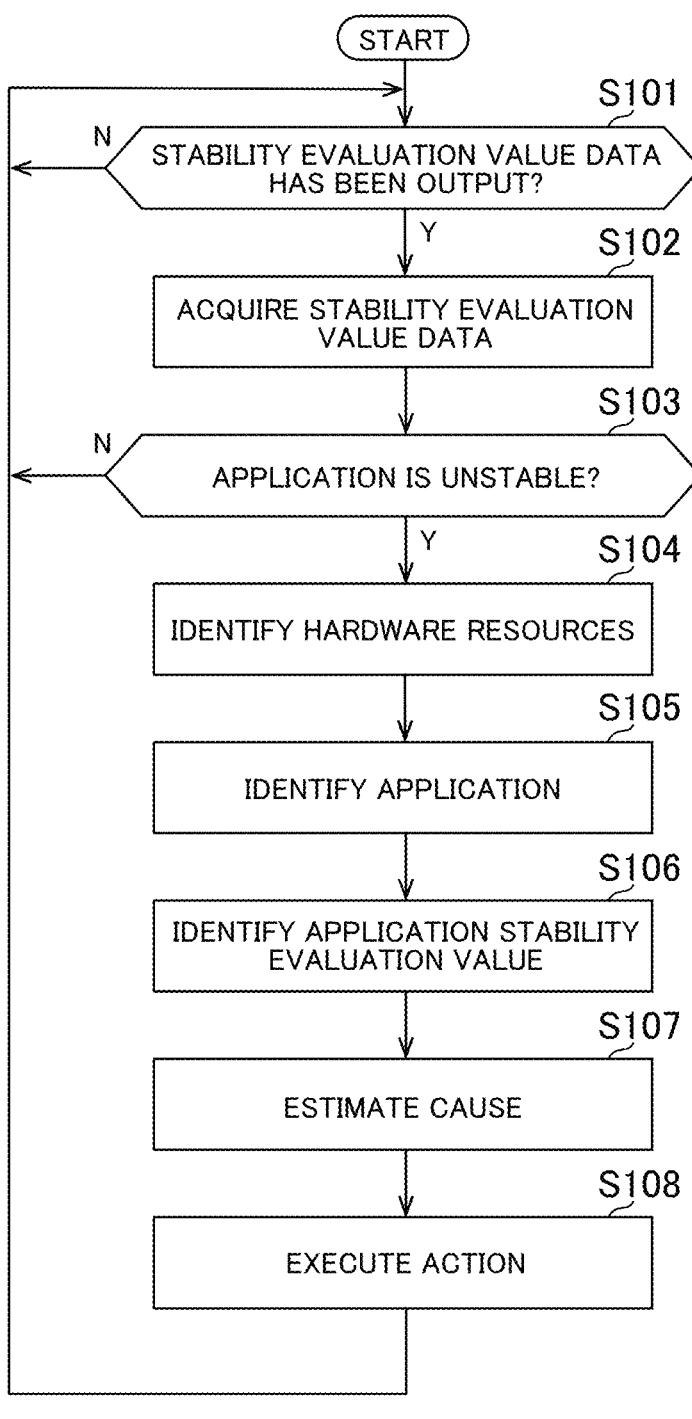
FIG. 9 is a flow chart for illustrating an example of a flow of a process performed by the platform system in the one embodiment of the present invention.

An example of a flow of a process relating to estimating the cause of why an application is unstable performed by the platform system 30 in this embodiment is now described with reference to the flow chart illustrated in FIG. 9.

In this process example, for example, the policy manager 90 monitors output of stability evaluation value data indicating the stability of an application to the data bus 68 (Step S101).

When output of the stability evaluation value data to the data bus 68 is detected, the policy manager 90 acquires the stability evaluation value data (Step S102).

Then, the policy manager 90 determines whether or not the application is unstable based on the stability evaluation value data indicating the stability of the application acquired in the process step of Step S102 (Step S103).

When it is not determined that the application is unstable ("N" in Step S103), the process returns to the process step of Step S101.

When it is determined that the application is unstable ("Y" in Step S103), the policy manager 90 identifies the plurality of hardware resources on which the processes included in the application are operating (Step S104). In this process example, the plurality of hardware resources on which the processes included in the application are operating can be identified by referring to the inventory data.

Then, the policy manager 90 identifies an application having a process which is operating on at least any one of the plurality of hardware resources identified in the process step of Step S104 (Step S105). In this process example, for each of the plurality of hardware resources, it is possible to identify an application having h is operating on the hardware resource by referring to the inventory data.

Then, the policy manager 90 identifies the latest application stability evaluation value of at least one application identified in the process step of Step S105 (Step S106).

Then, the cause of the application determined to be unstable in the process step of Step S103 is estimated based on the application stability evaluation value identified in the process step of Step S106 (Step S107).

Then, the policy manager 90 executes the action corresponding to the cause estimated in the process step of Step S107 (Step S108). In the process step of Step S108, for example, the policy manager 90, the life cycle manager 94, the container manager 78, and the configuration manager 76 may cooperate with each other to execute the action. Then, the process returns to the process step of Step S101.

In this embodiment, when it is determined that an application is unstable based on the application stability evaluation value summarized for a plurality of processes, the cause of why the application is unstable is estimated based on the application stability evaluation value of the other application.

Thus, even when the stability evaluation value of the application is identified based on the application stability evaluation value summarized for a plurality of processes, it is possible to accurately estimate the cause of why the application is unstable.

It should be noted that the present invention is not limited to the above-mentioned embodiment.

For example, the functional unit in this embodiment is not limited to those illustrated in FIG. 3.

Further, the functional unit in this embodiment is not required to be an NF in 5G. For example, the functional unit in this embodiment may be an eNodeB, a vDU, a vCU, a packet data network gateway (P-GW), a serving gateway (S-GW), a mobility management entity (MME), a home subscriber server (HSS), or another network node in 4G.

Further, the scope of application of the present invention is not limited to the applications included in the communication system 1. The present invention is also applicable to general applications other than applications included in communication system 1.

Further, the functional unit in this embodiment may be implemented through use of a hypervisor-type or host-type virtualization technology instead of the container-type virtualization technology. Further, the functional unit in this embodiment is not required to be implemented by software, and may be implemented by hardware such as an electronic circuit. Further, the functional unit in this embodiment may be implemented by a combination of an electronic circuit and software.

The technology disclosed in the present disclosure can also be expressed as follows.

[1] A cause estimation system including: first stability evaluation value identification means for identifying a stability evaluation value indicating a stability of a first application which includes processes that are dispersedly operating on a plurality of hardware resources; second stability evaluation value identification means for identifying a stability evaluation value indicating a stability of a second application in which at least one process is operating on the hardware resources on which at least one of the processes included in the first application is operating; instability determination means for determining whether the application is unstable based on the stability evaluation value indicating the stability of the application; and cause estimation means for estimating, when it is determined that the first application is unstable based on the stability evaluation value indicating the stability of the first application, based on the stability evaluation value indicating the stability of the second application, whether a cause of why the first application is unstable lies in the first application or lies in the hardware resource on which a process included in the first application is operating.

[2] The cause estimation system according to Item [1], wherein, when it is determined that the second application is not unstable based on the stability evaluation value indicating the stability of the second application, the cause estimation means is configured to estimate that the cause of why the first application is unstable lies in the first application.

[3] The cause estimation system according to Item [1] or [2], wherein, when it is determined that the second application is unstable based on the stability evaluation value indicating the stability of the second application, the cause estimation means is configured to estimate that the cause of why the first application is unstable lies in the hardware resource on which a process included in the first application is operating.

[4] The cause estimation system according to Item [1], wherein the cause estimation means is configured to estimate the cause lies in the first application or lies in the hardware resource based on at least one of the number of applications determined to be unstable or the number of applications determined to be not unstable among a plurality of the applications operating on any one of the hardware resources.

[5] The cause estimation system according to Item [4], wherein the cause estimation means is configured to estimate that the cause lies in the hardware resource in which the number of applications determined to be unstable is equal to or more than a predetermined number of two or more.

[6] The cause estimation system according to Item [4], wherein the cause estimation means is configured to estimate that the cause lies in the hardware resource in which a ratio of the number of applications determined to be unstable with respect to the number of applications operating on the hardware resources is equal to or more than a predetermined value.

[7] The cause estimation system according to Item [1], wherein, when it is determined that all of applications operating on any one of the hardware resources are unstable, the cause estimation means is configured to estimate that the cause lies in the any one of the hardware resources.

[8] The cause estimation system according to any one of Items [1] to [7], wherein the stability evaluation value indicating the stability of the application is identified based on a value, which is acquired for each type of process included in the application, indicating the stability of the type of process.

[9] The cause estimation system according to any one of Items [1] to [8], wherein the process is an execution unit of the application in a container-type virtualized application execution environment.

[10] The cause estimation system according to any one of Items [1] to [9], wherein the stability evaluation value indicating the stability of the application is identified based on at least one of a status of the processes included in the application, a lifetime of the processes included in the application, a length of time for which the processes included in the application have executed input and output, or the number of packets dropped by the processes included in the application.

[11] The cause estimation system according to any one of Items [1] to [10], wherein the stability evaluation value indicating the stability of the application is calculated in accordance with a rule associated with a type of the application.

[12] The cause estimation system according to any one of Items [1] to [11], further including action execution means for executing an action corresponding to the estimated cause.

[13] The cause estimation system according to Item [12], wherein the action execution means is configured to replace the first application.

[14] The cause estimation system according to Item or [13], wherein the action execution means is configured to separate the hardware resource from a cluster created by virtualization technology.

[15] The cause estimation system according to any one of Items [1] to [14], wherein the application is an application included in a communication system.

[16] The cause estimation system according to Item [15], wherein the application is a network function.

[17] A cause estimation method including: identifying a stability evaluation value indicating a stability of a first application which includes processes that are dispersedly operating on a plurality of hardware resources; identifying a stability evaluation value indicating a stability of a second application in which at least one process is operating on the hardware resources on which at least one of the processes included in the first application is operating; determining whether the application is unstable based on the stability evaluation value indicating the stability of the application; and estimating, when it is determined that the first application is unstable based on the stability evaluation value indicating the stability of the first application, based on the stability evaluation value indicating the stability of the second application, whether a cause of why the first application is unstable lies in the first application or lies in the hardware resource on which a process included in the first application is operating.

The invention claimed is:

1. A cause estimation system, comprising one or more processors, the cause estimation system causing at least one of the one or more processors to execute:

a first stability evaluation value identification process of identifying a first stability evaluation value indicating a stability of a first application which includes processes that are dispersedly operating on a plurality of hardware resources;

a second stability evaluation value identification process of identifying a second stability evaluation value indicating a stability of a second application in which at least one process is operating on the hardware resources on which at least one of the processes included in the first application is operating;

an instability determination process of determining whether the first application is unstable based on the first stability evaluation value indicating the stability of the first application; and a cause estimation process for estimating, when it is determined that the first application is unstable based on the first stability evaluation value indicating the stability of the first application, based on the second stability evaluation value indicating the stability of the second application, whether a cause of why the first application is unstable lies in the first application or lies in the hardware resource on which the at least one process included in the first application is operating.

2. The cause estimation system according to claim 1, wherein, in the cause estimation process, when it is determined that the second application is not unstable based on the second stability evaluation value indicating the stability of the second application, the cause of why the first application is unstable is estimated to lie in the first application.

3. The cause estimation system according to claim 1, wherein, in the cause estimation process, when it is determined that the second application is unstable based on the second stability evaluation value indicating the stability of the second application, the cause of why the first application is unstable is estimated to lie in the hardware resource on which the at least one process included in the first application is operating.

4. The cause estimation system according to claim 1, wherein, in the cause estimation process, whether the cause lies in the first application or lies in the hardware resource is estimated based on at least one of the number of applications determined to be unstable or the number of applications determined to be not unstable among a plurality of the applications operating on any one of the hardware resources.

5. The cause estimation system according to claim 4, wherein, in the cause estimation process, the cause is estimated to lie in the hardware resource in which the number of applications determined to be unstable is equal to or more than a predetermined number of two or more.

6. The cause estimation system according to claim 4, wherein, in the cause estimation process, the cause is estimated to lie in the hardware resource in which a ratio of the number of applications determined to be unstable with respect to the number of applications operating on the hardware resource is equal to or more than a predetermined value.

7. The cause estimation system according to claim 1, wherein, in the cause estimation process, when it is determined that all of applications operating on any one of the hardware resources are unstable, the cause is estimated to lie in the any one of the hardware resources.

8. The cause estimation system according to claim 1, wherein the first stability evaluation value indicating the stability of the first application or the second stability evaluation value indicating the stability of the second application is identified based on a value, which is acquired for each type of process included in the first application or the second application, indicating the stability of the type of process.

9. The cause estimation system according to claim 1, wherein the process is an execution unit of the application in a container-type virtualized application execution environment.

10. The cause estimation system according to claim 1, wherein the first stability evaluation value indicating the stability of the first application or the second stability evaluation value indicating the stability of the second application is identified based on at least one of a status of the processes included in the first or second application, a lifetime of the processes included in the first or second application, a length of time for which the processes included in the first or second application have executed input and output, or the number of packets dropped by the processes included in the first or second application.

11. The cause estimation system according to claim 1, wherein the first stability evaluation value indicating the stability of the first application or the second stability evaluation value indicating the stability of the second application is calculated in accordance with a rule associated with a type of the first or second application.

12. The cause estimation system according to claim 1, wherein the cause estimation system causes the at least one of the one or more processors to execute an action execution process of executing an action corresponding to the estimated cause.

13. The cause estimation system according to claim 12, wherein, in the action execution process, the first application is replaced.

14. The cause estimation system according to claim 12, wherein, in the action execution process, the hardware resource is separated from a cluster created by virtualization technology.

15. The cause estimation system according to claim 1, wherein the first or second application is an application included in a communication system.

16. The cause estimation system according to claim 15, wherein the first or second application is a network function.

17. A cause estimation method, comprising:

identifying a first stability evaluation value indicating a stability of a first application which includes processes that are dispersedly operating on a plurality of hardware resources;

identifying a second stability evaluation value indicating a stability of a second application in which at least one process is operating on the hardware resources on which at least one of the processes included in the first application is operating;

determining whether the first application is unstable based on the first stability evaluation value indicating the stability of the first application; and estimating, first when it is determined that the first application is unstable based on the first stability evaluation value indicating the stability of the first application, based on the second stability evaluation value indicating the stability of the second application, whether a cause of why the first application is unstable lies in the first application or lies in the hardware resource on which the at least one process included in the first application is operating.

* * * * *